Jan. 14, 1969 M. V. ROODE ET AL 3,421,969
BEARING PREFORM MEANS
Filed Nov. 19, 1964 Sheet 1 of 2

INVENTORS
Melvin V. Roode
BY James F. Marlow

Their Attorney

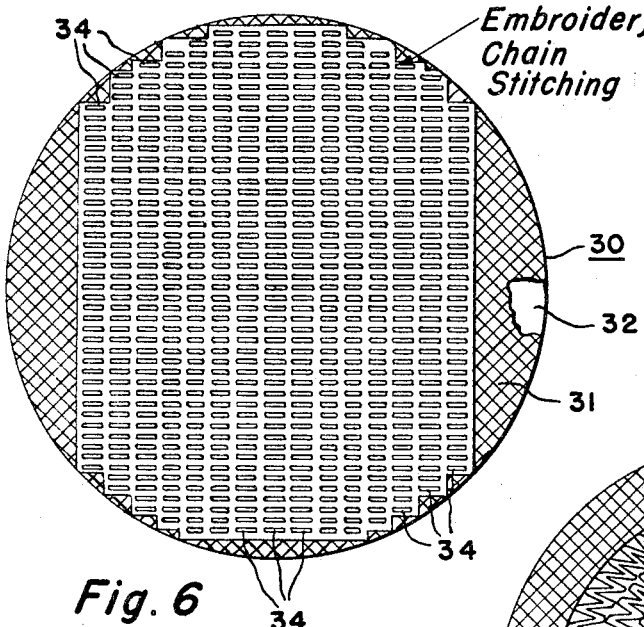
Fig. 6
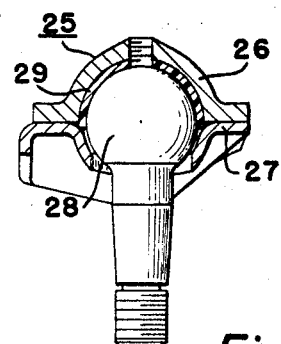
Fig. 5
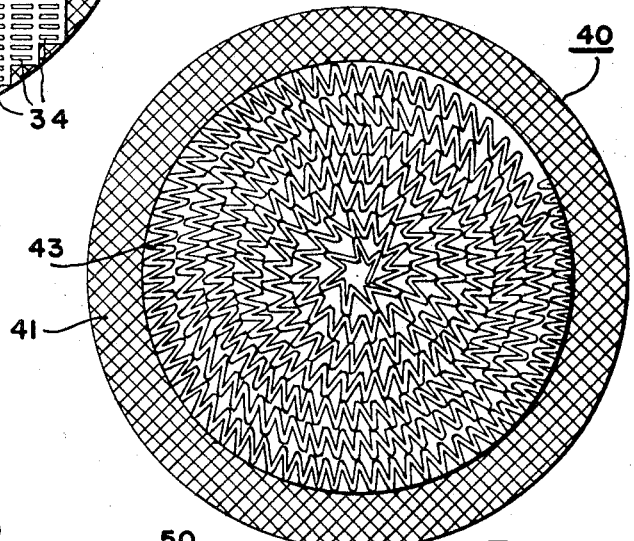
Fig. 7
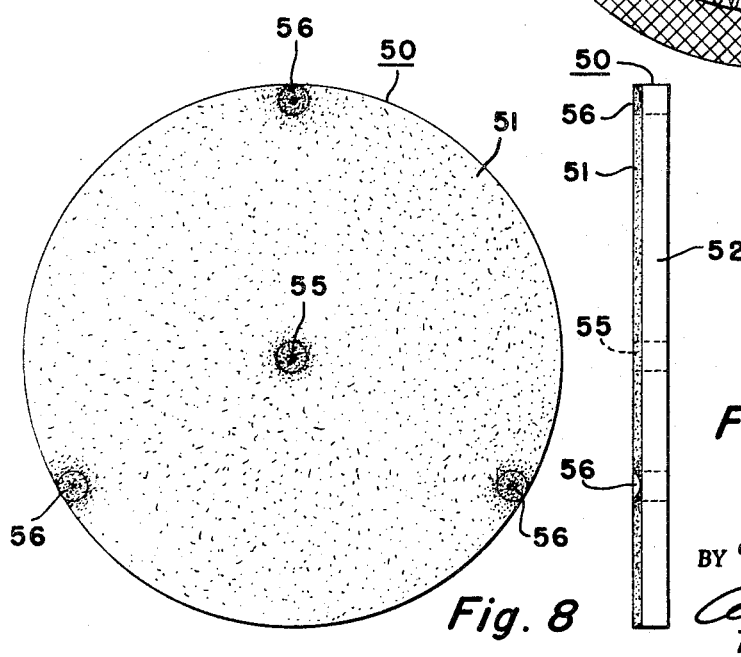
Fig. 8
Fig. 9
INVENTORS
Melvin V. Roode
James F. Marlow
BY
Their Attorney

United States Patent Office 3,421,969
Patented Jan. 14, 1969

3,421,969
BEARING PREFORM MEANS
Melvin V. Roode and James F. Marlow, Dayton, Ohio, assignors to General Motors Corporation, Detroit, Mich., a corporation of Delaware
Filed Nov. 19, 1964, Ser. No. 412,436
U.S. Cl. 161—148
Int. Cl. D04h *1/58;* B32b *7/14*
2 Claims

ABSTRACT OF THE DISCLOSURE

A bearing preform laminant composed of two laminations of phenolic impregnated fibrous material bonded together and a selected pattern of stitching of polytetrafluorethylene threads on at least one side of the laminant to provide a low friction bearing surface.

---

This invention relates to ball joint seat formation, and, more particularly, to economical use of relatively expensive fluorine containing low-friction material in only restricted locations of backing material of bearing preform means such as for a ball joint assembly.

An object of this invention is to provide a reduction in quantity of fluorine-containing resin means or polytetrafluoroethylene yarn added to a ball-joint-type bearing preform means including an inexpensive backup material which predominates subject to predetermined stitching of more expensive yarn or thread in only limited areas with a "button-hole-type" operation including a chain stitch on one side and tie stitch complementary thereto on an opposite side for substantially equal amounts of relatively expensive fluorine containing low-friction material along surfacing on opposite sides of the inexpensive backup material therebetween.

Another object of this invention is to provide a ball joint bearing preform means including an annular piece of inexpensive backup material sandwiched between opposite stitching at least of polytetrafluoroethylene thread on one side thereof to follow a zig-zag path in a substantially squared configuration within peripheral edging limits of the backup material.

Another object of this invention is to provide a ball joint bearing preform means incuding an annular piece of inexpensive backup material sandwiched between opposite stitching at least of polytetrafluoroethylene thread on one side thereof in varying parallel zig-zag paths across the annular piece.

A further object of this invention is to provide a ball joint bearing preform means having in combination an annular piece of inexpensive backup material made from a dry blend mixture of cotton cord having a length in a range between a quarter to one inch, sisal fibers and powdered phenolic resin onto opposite sides of which embroidery of polytetrafluoroethylene thread is stitched in a predetermined path covering only a limited area to save on use of relatively expensive thread with a minmum thereof only on opposite surfacing since use of more polytetrafluoroethylene thread all through between the surfacing would be wasteful though the backup material is left exposed on surfacing for control of break away friction which is difficult to control with compound weaving thus obviated.

Another object of this invention is to provide a ball joint bearing preform means including in combination a laminate of a cotton and sisal fiber mat impregnated with phenolic resin and of polytetrafluoroethylene thread sown to phenolic impregnated cotton with at least one ultrasonic plastic weld location for bond of phenolic resin of the phenolic impregnated cotton and of the fiber mat due to ultrasonic frequency.

Further objects and advantages of the present invention will be apparent from the following description, reference being had to the accompanying drawings wherein preferred embodiments of the present invention are clearly shown.

In the drawings:

FIGURE 5 is a cross sectioned elevational view representative of preform means of this invention as installed in a ball joint assembly.

FIGURE 6 is a plan view of another ball joint bearing preform means having embroidery "button-hole" stitching in parallel paths thereon.

FIGURE 7 is a plan view of another ball joint bearing preform means having an annular configuration of polytetrafluoroethylene stitching less than total area of an annular backup piece.

FIGURE 8 is a plan view of a laminated ball joint bearing preform means having at least one ultrasonic weld location for curing of phenolic resin impregnations of differing layers held thereby to each other.

FIGURE 9 is a side view of the preform means of FIGURE 8.

Various approaches have been made concerning use of relatively expensive polytetrafluoroethylene or Teflon material in bearing structures. Such polytetrafluoroethylene or fluorine-containing resin means has been noted in disclosures of Patents 3,097,060, Sullivan issued July 9, 1963, as well as 3,091,486, Baker issued May 28, 1963 and elsewhere. Furthermore, in accordance with a teaching of a Patent 2,917,334, Baker issued Dec. 15, 1959 it is advantageous to have a ball portion of a stud engage only a limited zone or truncated spherical area of a socket means having a liner or bearing preform means carried therein. The patents just noted all belong to the assignee of the present invention and in view of mass production usage of relatively expensive fluorine-containing resin means a problem can exist to reduce costs though maintaining performance characteristics and quality which can be achieved in accordance with the present invention.

Figure 1:
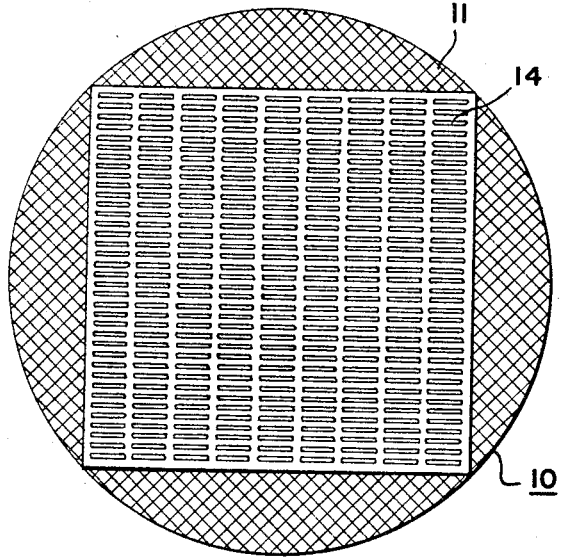
FIGURE 1 is a plan view of a ball joint bearing preform means having stitch features in accordance with the present invention.
Figure 2:
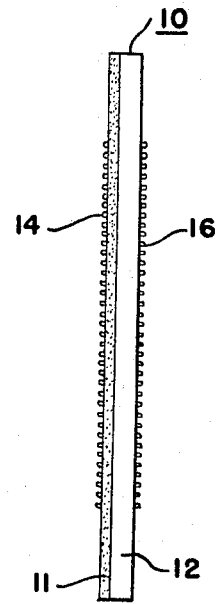
FIGURE 2 is an end view of the preform means of FIGURE 1 and showing chain and tie stitch layers only on opposite surfacing.

Thus in FIGURE 1 of the drawings there is shown a bearing preform means generally indicated by numeral 10 having a primary or predominate backup portion 11 including a combination of cellulosic fibers such as cotton cloth and paper having a liquid phenolic resin impregnation therewith to adhere this primary surface ply to a backup material 12 shown in FIGURE 2. The backup 12 is a "cookie" or slurry of cotton cord, sisal fiber and phenolic resin which is compatible for adhering with the phenolic impregnated cellulosic material of the surface portion 11. The preform means 10 has a substantially annular configuration and since it has been found that use of Teflon or polytetrafluoroethylene resin means throughout the surface thereof is both undesirable and unnecessary due to break-away torque characteristics and cost, in accordance with the present invention there is provided a squared configuration of stitching 14 of polytetrafluoroethylene thread at least on one side of the preform means joined and anchored by a tie stitch portion 16 complementary thereto on an opposite side of the preform means. The stitching 14 and 16 can be made by use of a suitable sewing machine which is able to sew through the portions 11 and 12 thus requiring relatively expensive fluorine-containing resin means or thread for such stitching 14 and/or 16 only along opposite surfacing rather than interwoven as a compound weave as has also been disclosed elsewhere. The compound weaving is expensive and requires an excessive amount of fluorine-containing resin means resulting in difficulty in control of break-away friction which is more readily controllable by having stitching 14 in isolated areas and in substantially parallel paths though confined to a substantially squared area of the annular preform means 10. The stitching 14 assures presence of only a minimum of fluorine-containing resin necessary for a purpose of utilizing low-friction characteristic thereof though backup material of the secondary portion 12 for example can be made inexpensively from a dry blend mixture of cotton cord having a length in a range between one fourth inch and one inch, sisal fibers having a length of substantially one inch, and a powdered phenolic resin. The fluorine-containing thread is stitched to substrate inexpensive portions 11–12 using a sewing machine which has a 400 denier polytetrafluoroethylene thread fed to the machine's needle. A suitable inexpensive cotton tie thread can be fed from the sewing machine bobbin. This tie thread for stitching 16 however can also be polytetrafluoroethylene material so that there is an equal amount of fluorine-containing resin on opposite sides of the preform means 10.

Figure 3:
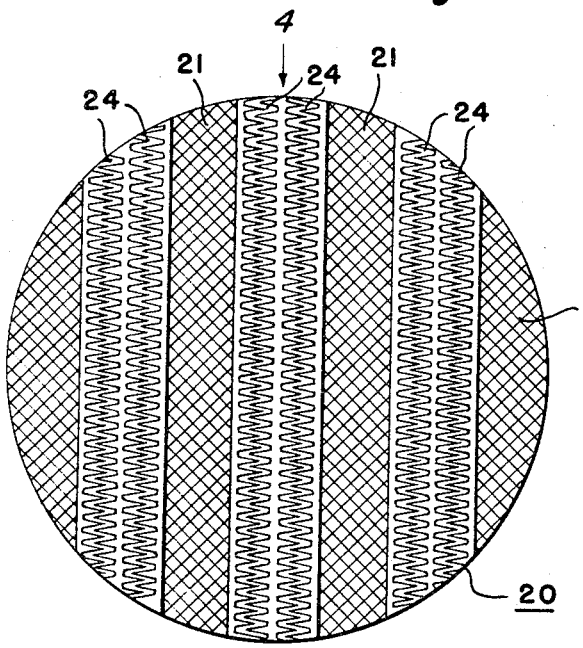
FIGURE 3 is a plan view of another ball joint bearing preform means having zig-zag stitch of fluorine-containing threads.
Figure 4:
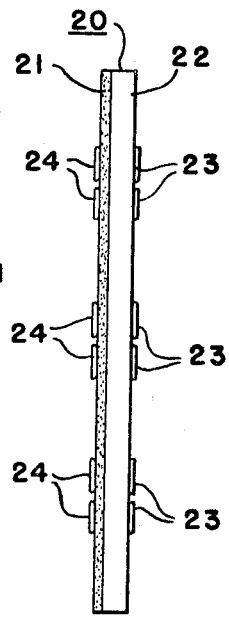
FIGURE 4 is an edge view taken in the direction of arrow 4 in FIGURE 3.

FIGURES 3 and 4 of the drawings show another preform means generally indicated by numeral 20 including a first or primary backup portion 21 as well as a second backup material 22 both having a substantially annular configuration. The composition of the backup portion 22 is again a "cookie" or slurry made of mixed cotton cord, sisal and phenolic resin including percentages of substantially 43.5% powdered resin, 40% cotton cord and 16.5% sisal fibers. A quantity of approximately 5.5 grams of the dry blend, backup material is compressed into a configuration having the anular outer periphery shown in FIGURE 3 for example under 15,000 pounds per square inch pressure and at room temperature. The compressed backup portion of slurry is then coated on at least one surface with a liquid phenolic resin means to permit adherence thereof to the primary surface ply 21 also of inexpensive cotton or paper material as a substrate layer. The backup composite of layers is placed in an air circulating oven for substantially ten minutes at 200° F. This advances the liquid resin of phenolic material to a semi-cured or tacky "B" stage of curing thus adhering the bearing substrate plies of backup materials together. As illustrated in FIGURES 3 and 4 of the drawings, plural parallel paths of zig-zag stitching of fluorine-containing or polytetrafluoroethylene thread 24 is provided on at least one surface with a tie stitch 26 in complementary relation thereto on an opposite surface as indicated in FIGURE 4. The preform means such as shown in views of FIGURES 1 through 4 inclusive can be secured to an inner periphery of a ball joint socket portion.

In FIGURE 5 there is shown a ball joint socket means generally indicated by numeral 25 including a curved or at least partially semispherical socket portion 26 as well as a centrally apertured closure or cover portion 27 thereof. A curved or ball-shaped head 28 of a stud means is fitted complementary thereto in engagement with a preform means 29 which has been described in further detail as having features that can be seen in views of FIGURES 1 through 4 inclusive. The cover and socket portions 26–27 can be suitably joined to each other such as by welding or fastening means including rivets, screws and the like. A ball joint means such as 25 using preform means having details as described for FIGURES 1 through 4 inclusive can have an impact strength averaging 1340 inch/pounds while encountering a wear of only 0.003 inch. Such wear and impact characteristics compare favorably with results obtainable when using a compound weaving which is considerably more expensive and difficult so far as torque control is concerned than when using preform means in accordance with the preesnt invention having the stitching as described in less than an entire annular surfacing on one side of the preform means.

In FIGURE 6 there is a view illustrating another preform means generally indicated by numeral 30 with a backup means 31 and 32 similar to that described previously as well as having embroidery or "buttonhole" stitching 34 provided on surfacing thereof. This embroidery or "buttonhole" stitching 34 can also follow plural parallel paths transversely across the annular preform means 30.

FIGURE 7 shows another preform means generally indicated by numeral 40 having a backup portion 41 of relatively inexpensive cotton cloth material 41 onto which fluorine-containing or polytetrafluoroethylene thread is stitched in an annular area 43 less than complete annular area of the cotton cloth backup means 41. For a two inch diameter backup portion 41 such stitching can include polytetrafluoroethylene threads in the area 43 having a total of substantially 2.08 square inches stitched thereto. It is to be understood that not only a "buttonhole" type of stitching can be used but also a sewing machine can be provided with a monogram sewing attachment which is well known and which will provide a suitable embroidery or stitching in only predetermined areas of the preform means. An operator can guide a sewing machine needle or an automatic programming means can be provided for controlling such a sewing machine anywhere within a one inch radius for example and this will permit proper stitching in accordance with the present invention on a two inch diameter preform means. When using polytetrafluoroethylene threads on opposite sides of the preform means it is possible to have only a minimum amount of such expensive fluorine-containing resin thread on opposite surfacing of the preform means. The "buttonhole" stitch including the chain and tie portions thereof will provide substantially equal quantities of the relatively expensive fluorine-containing or polytetrafluoroethylene thread means on both sides of the preform means. It is to be noted particularly that use of 100% polytetrafluoroethylene threads throughout an annular area would be wasteful and unnecessary and thus the stitching is particularly advantageous since no such relatively solid Teflon material is provided throughout any annular or predetermined area of the preform means. At the same time, more celculosic material or cotton fibers can be used whereby friction thereof is greater and can be more readily controlled as to the breakaway condition when cooperating ball portion 28 and preform means 29 having stitching for instance are cooperable within a socket portion 26 of a ball joint means 25.

FIGURES 8 and 9 of the drawings show another preform means generally indicated by numeral 50 having a primary bearing ply 51 and a backup secondary ply 52 as indicated in FIGURE 9. The primary bearing ply 51 can have both cotton and Teflon threads impregnated with phenolic resin means. The backup or secondary ply 52 is a cotton and sisal fiber mat impregnated with phenolic resin. The juncture of the plies 51 and 52 in the embodiment of FIGURES 8 and 9 is achieved by sonifier or plastic welding equipment rather than in an oven or under heat. Thus an ultrasonically transmitted high frequency wave form can be concentrated in particular locations such as centrally at a "spot" weld juncture 55. Also plural peripheral ultrasonic "spot" weld locations 56 can be provided as indicated in the drawings. These peripheral "spot" welds achieved sonically are to be located within substantially one eighth of an inch of the outer diameter of the preform means 50 and the diameter of each such "spot" weld location is substantially 0.080 inch. Such sonic plastic welding results in isolated curing of the phenolic resin means at the contact areas and points of contact between the bearing plies 51 and 52 such that the surface and substrate portions are adequately joined for installation in a ball joint means such as illustrated in FIGURE 5 of the drawings. It is to be noted that at least one such sonic weld location centrally at the location 55 is to be provided and the diameter of this central weld is substantially 0.140 inch and thus greater than the peripheral weld areas. Each weld leaves an indentation resulting from the high frequency waves during contact of a welding stud with the preform plies for substantially one second at ten pounds per square inch. Thus the layers are properly located and secured to each other for production installation.

Embroidery chain stitching as noted in the description and drawings is distinguishable from sewing. Both embroidery stitching and sewing are entirely different from weaving which requires threads interlaced in a predetermined manner using excessive Teflon or polytetrafluoroethylene thread. By contrast, a minimum of such expensive fluorine-containing material is used and can be concentrated in particular locality by embroidery stitching readily accomplished on commercially available machines such as for making monograms on shirts. Embroidery stitching is done with a machine requiring no bobbin thread and without a tie stitch. However, such a tie stitch is provided when patterns of fluorine-containing materials are sewed in place in the present disclosure. The embroidery type of stitching is desirable in that the embroidery of fluorine-containing material can be added to particular surface areas and thus substantially less of the expensive material is used anywhere else in the bearing means for considerable savings in expense for material, time and labor.

What is claimed is as follows:

1. A bearing preform laminant comprising first and second laminations of phenolic impregnated fibrous material securely bonded together and a selected pattern of stitching of polytetrafluoroethylene threads on at least one side of said laminant.

2. A bearing preform laminant comprising first and second laminations of phenolic impregnated fibrous material, a selected pattern of stitching of polytetrafluoroethylene threads on at least one side of said laminant and ultrasonic plastic welds extending through said first and second laminations for bonding said laminations together.

References Cited
UNITED STATES PATENTS

| | | | |
|---|---|---|---|
| 2,804,886 | 9/1957 | White | 161 |
| 2,908,535 | 10/1959 | Runton et al. | 161—42 XR |

JACOB H. STEINBERG, *Primary Examiner.*

W. A. POWELL, *Assistant Examiner.*

U.S. Cl. X.R.

161—42, 50, 189; 156—93, 290; 112—266, 439; 308—238